(12) United States Patent
Lin et al.

(10) Patent No.: US 10,908,731 B1
(45) Date of Patent: Feb. 2, 2021

(54) FINGERPRINT RECOGNITION DEVICE WITH WAKE-UP FUNCTION AND DRIVING METHOD THEREOF

(71) Applicant: AU OPTRONICS CORPORATION, Hsin-Chu (TW)

(72) Inventors: Yi-Hsin Lin, Hsin-Chu (TW); Hung-Wen Chou, Hsin-Chu (TW); Yu-Jing Chen, Hsin-Chu (TW); Chia-Ching Chen, Hsin-Chu (TW); Tsun-Chien Cheng, Hsin-Chu (TW); Chun-Ku Kuo, Hsin-Chu (TW); Po-Yuan Liu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/906,174

(22) Filed: Jun. 19, 2020

(30) Foreign Application Priority Data

Dec. 26, 2019 (TW) ............................. 108147930 A

(51) Int. Cl.
| | |
|---|---|
| *G06F 3/041* | (2006.01) |
| *G06F 9/00* | (2006.01) |
| *G06F 3/044* | (2006.01) |
| *G06K 9/00* | (2006.01) |
| *G06F 3/042* | (2006.01) |

(52) U.S. Cl.
CPC ............ *G06F 3/0416* (2013.01); *G06F 3/042* (2013.01); *G06F 3/0446* (2019.05); *G06K 9/00013* (2013.01)

(58) Field of Classification Search
USPC ......................................................... 345/174
See application file for complete search history.

(56) References Cited

U.S. PATENT DOCUMENTS

| | | | | |
|---|---|---|---|---|
| 2012/0071149 | A1* | 3/2012 | Bandyopadhyay | H04M 1/67 455/418 |
| 2014/0213323 | A1* | 7/2014 | Holenarsipur | G06F 3/0304 455/566 |
| 2014/0369574 | A1* | 12/2014 | Shie | G06K 9/0002 382/124 |
| 2016/0321493 | A1* | 11/2016 | Pope | G06F 3/0416 |

(Continued)

FOREIGN PATENT DOCUMENTS

| | | |
|---|---|---|
| CN | 106383623 A | 2/2017 |
| CN | 106845322 A | 6/2017 |

*Primary Examiner* — Chineyere D Wills-Burns
(74) *Attorney, Agent, or Firm* — WPAT, PC

(57) ABSTRACT

A fingerprint recognition device with a wake-up function is provided, which includes a signal wiring, a sensing array at least partially surrounded by the signal wiring, a first electrode, and a control circuit. The control circuit is coupled with the signal wiring, the first electrode, and the sensing array. The control circuit detects capacitance between the signal wiring and the first electrode in a first operation mode to generate a sensing result, and determines whether an object is on or near the sensing array according to the sensing result. If the control circuit determines that the object is on or near the sensing array, the control circuit switches from the first operation mode to a second operation mode. The control circuit drives the sensing array by the signal wiring to generate multiple sensing signals in the second operation mode, and calculates a sensed image according to the multiple sensing signals.

10 Claims, 7 Drawing Sheets

(56) References Cited

U.S. PATENT DOCUMENTS

| | | | |
|---|---|---|---|
| 2017/0177919 A1* | 6/2017 | Wang | G01R 27/2605 |
| 2018/0211078 A1* | 7/2018 | Lillie | G06F 3/044 |
| 2018/0349668 A1* | 12/2018 | Yang | G06F 3/0412 |
| 2019/0102009 A1* | 4/2019 | Takada | G02F 1/1343 |
| 2019/0354739 A1* | 11/2019 | Shibano | G06K 9/0002 |

* cited by examiner

FINGERPRINT RECOGNITION DEVICE WITH WAKE-UP FUNCTION AND DRIVING METHOD THEREOF

CROSS-REFERENCE TO RELATED APPLICATION

This application claims priority to Taiwan Application Number 108147930, filed on Dec. 26, 2019, which is herein incorporated by reference in its entirety.

BACKGROUND

Technical Field

The present disclosure generally relates to a fingerprint recognition device. More particularly, the present disclosure relates to a fingerprint recognition device with wake-up function.

Description of Related Art

Consumer electronic devices such as mobile phones, notebook computers, etc. usually include fingerprint recognition modules to improve security, and the user can also wake up the displays, the keyboards, or the touch panels in the electronic devices by the fingerprint recognition modules. However, these fingerprint recognition modules are required to maintain in operating status to response to the touch from the user in time, causing significantly power consumption to the electronic devices.

SUMMARY

The disclosure provides a fingerprint recognition device with a wake-up function including a signal wiring, a sensing array, a first electrode, and a control circuit. The sensing array is at least partially surrounded by the signal wiring. The control circuit is coupled with the signal wiring, the first electrode, and the sensing array. The control circuit is configured to detect capacitance between the signal wiring and the first electrode in a first operation mode to generate a sensing result, and is configured to determine whether an object is on or near the sensing array according to the sensing result. If the control circuit determines that the object is on or near the sensing array, the control circuit switches from the first operation mode to a second operation mode. The control circuit is further configured to drive the sensing array by the signal wiring in order to generate a plurality of sensing signals in the second operation mode, and is further configured to calculate a sensed image according to the plurality of sensing signals.

The disclosure provides a fingerprint recognition device with a wake-up function including a signal wiring, a sensing array, a first test pad, a second test pad, and a control circuit. The sensing array is at least partially surrounded by the signal wiring. The control circuit is coupled with the signal wiring, the first test pad, the second test pad, and the sensing array. The control circuit is configured to detect capacitance between the first test pad and the second test pad in a first operation mode to generate a sensing result, and is configured to determine whether an object is on or near the sensing array according to the sensing result. If the control circuit determines that the object is on or near the sensing array, the control circuit switches from the first operation mode to a second operation mode. The control circuit is further configured to provide a driving voltage to the signal wiring in the second operation mode to drive the sensing array to generate a plurality of sensing signals, and the control circuit is further configured to calculate a sensed image according to the plurality of sensing signals.

The disclosure provides a driving method suitable for a fingerprint recognition device. The driving method includes the following operations: in a first operation mode, detecting capacitance between a signal wiring of the fingerprint recognition device and a first electrode of the fingerprint recognition device to generate a sensing result; determining, according to the sensing result, whether an object is on or near a sensing array of the fingerprint recognition device, wherein the sensing array is at least partially surrounded by the signal wiring, and if the object is on or near the sensing array, switches from the first operation mode to a second operation mode; in the second operation mode, driving the sensing array to generate a plurality of sensing signals; and generating a sensed image according to the plurality of sensing signals.

The disclosure provides a driving method suitable for a fingerprint recognition device. The driving method includes the following operations: in a first operation mode, detecting capacitance between a first test pad of the fingerprint recognition device and a second test pad of the fingerprint recognition device to generate a sensing result, wherein a laser cutting area of the fingerprint recognition device electrically isolates the first test pad and the second test pad from a sensing array of the fingerprint recognition device; determining, according to the sensing result, whether an object is on or near the sensing array, wherein if the object is on or near the sensing array, switches from the first operation mode to a second operation mode; in the second operation mode, driving the sensing array by a signal wiring to generate a plurality of sensing signals, wherein the sensing array is at least partially surrounded by the signal wiring; and generating a sensed image according to the plurality of sensing signals.

It is to be understood that both the foregoing general description and the following detailed description are by examples, and are intended to provide further explanation of the disclosure as claimed.

DETAILED DESCRIPTION

Figure 1:
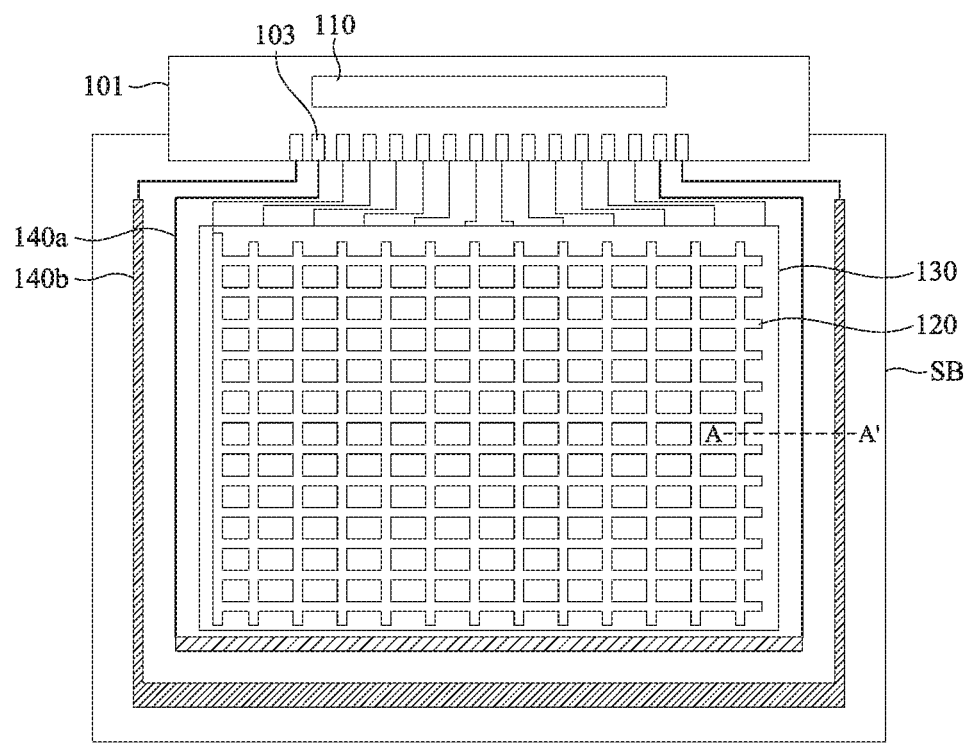
FIG. 1 is a simplified functional block diagram of a fingerprint recognition device according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
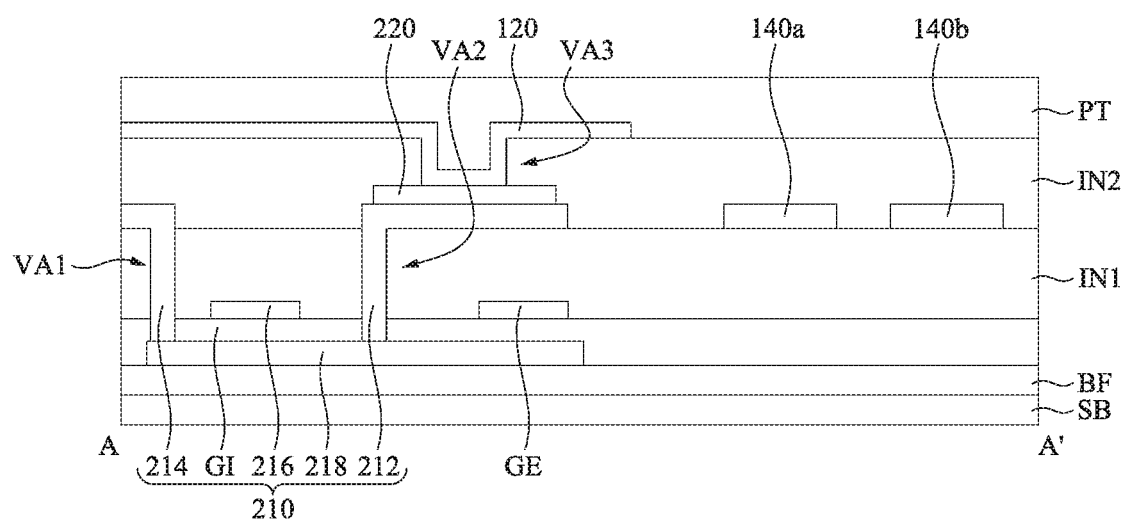
FIG. 2 is a simplified cross-sectional diagram of the fingerprint recognition device of FIG. 1 along the direction A-A'.

FIG. 1 is a simplified functional block diagram of a fingerprint recognition device 100 according to one embodiment of the present disclosure. FIG. 2 is a simplified cross-sectional diagram of the fingerprint recognition device 100 along the direction A-A'. Reference is made to FIG. 1 and FIG. 2. The fingerprint recognition device 100 comprises a control circuit 110, a mesh electrode 120, a sensing array 130, and a plurality of signal wirings (e.g., a first signal wiring 140a and a second signal wiring 140b). For the sake of brevity, other functional blocks of the fingerprint recognition device 100 are not shown in FIG. 1. The sensing array 130 is at least partially overlapping with the mesh electrode 120 in the vertical projection direction, and the sensing array 130 defines an active area which is capable of performing a fingerprint recognition function. The sensing array 130 comprises a plurality of sensing pixels (not shown), and each sensing pixel may comprise a plurality of transistors (e.g., the transistor 210 of FIG. 2) and a photosensitive element 220.

Specifically, the transistor 210 is disposed on the buffer layer BF, and the buffer layer BF is disposed on the substrate SB. The transistor 210 comprises a source 212, a drain 214, a gate 216, a semiconductor layer 218, and a gate insulator layer GI. The semiconductor layer 218 is disposed on the buffer layer BF, and the gate insulator layer GI covers on the semiconductor layer 218. The gate 216 is disposed on the gate insulator layer GI, and the first insulator layer IN1 is covered on the gate 216. The first insulator layer IN1 comprises a first through hole VA1 and a second through hole VA2, and the first through hole VA1 and the second through hole VA2 expose part of the semiconductor layer 218 so that the source 212 and drain 214 can be electrically coupled with the semiconductor layer 218 by passing through the gate insulator layer GI and the first insulator layer IN1. The photosensitive element 220 is electrically coupled with the source 212, and the second insulator layer IN2 is covered on the photosensitive element 220. The mesh electrode 120 is disposed on the second insulator layer IN2, and the second insulator layer IN2 comprises a third through hole VA3 exposing part of the photosensitive element 220 so that the mesh electrode 120 can be electrically coupled with the photosensitive element 220 by passing through the second insulator layer IN2. Further, a protection layer PT can be disposed on or over the mesh electrode 120.

In practice, the mesh electrode 120 may be realized by the transparent conductive film, such as tin-indium oxide (ITO). The control circuit 110 may be realized by the general purpose processor, the digital signal processors (DSP), the application specific integrated circuit (ASIC), the field programmable gate array (FPGA), other programmable logic circuits, or a combination of one or more of thereof.

In other words, the mesh electrode 120 is disposed over the sensing array 130, and is electrically coupled with the sensing array 130. The mesh electrode 120 can be used as an electrode of the photosensitive element 220 so as to provide an operation voltage required by the photosensitive element 220.

The first signal wiring 140a and the second signal wiring 140b are disposed at a peripheral area surrounding the active area. The overall shape of the mesh electrode 120 is, but not limited to, of a rectangle. At least partially of the sides (e.g., three sides) of the mesh electrode 120 are surrounded by the first signal wiring 140a and the second signal wiring 140b. In this embodiment, the first signal wiring 140a, the second signal wiring 140b, the source 212, and the drain 214 are implemented at the same layer. The first signal wiring 140a is configured to provide an electrical input to the shift registers of the fingerprint recognition device 100 (not shown), where the shift registers are disposed in the peripheral area and configured to drive the sensing array 130. For example, the shift registers may transmit driving signals to the gate 216 of the transistor 210 via the driving line GE of FIG. 2. In addition, the second signal wiring 140b may be configured to provide a ground voltage to isolate external electrical noise.

In this embodiment, the control circuit 110 reads the plurality of sensing signals corresponding to the fingerprint recognition from the sensing array 130, and calculates a sensed image (e.g., the fingerprint of a user) according the plurality of sensing signals. The control circuit 110 can be disposed on the flexible circuit board 101 by using chip on film (COF) technology, and the control circuit 110 is coupled with the mesh electrode 120, the sensing array 130, and the plurality of signal wirings through a plurality of pins 103 of the flexible circuit board 101, but this disclosure is not limited thereto. In some embodiments, the control circuit 110 may be disposed on the substrate SB by using chip on glass (COG) technology.

In other embodiments, the fingerprint recognition device 100 further comprises a backlight module (not shown) disposed beneath the substrate SB.

Figure 3:
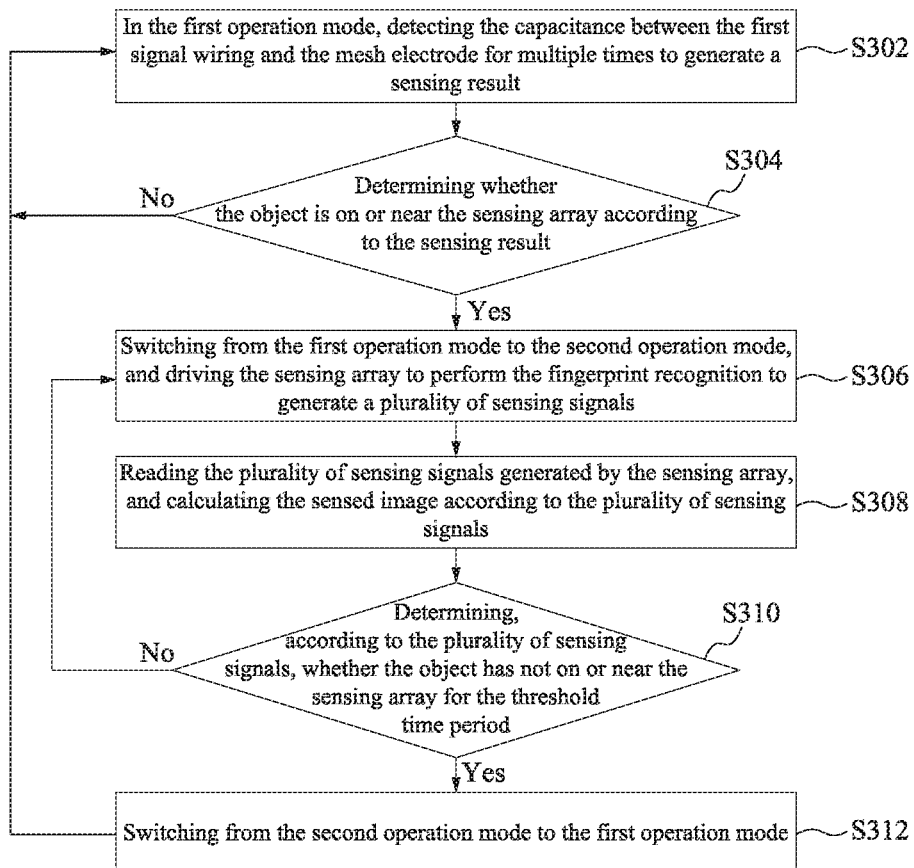
FIG. 3 is a flowchart of a driving method according to one embodiment of the present disclosure.

FIG. 3 is a flowchart of a driving method 300 according to one embodiment of the present disclosure. When the aforementioned fingerprint recognition device 100 performs the driving method 300, the fingerprint recognition device 100 may have the wake-up function. In operation S302, the control circuit 110 operates in a first operation mode (e.g., a sleep mode), and periodically or non-periodically detects, for multiple times, capacitance between the first signal wiring 140a and the mesh electrode 120 in order to generate a sensing result, but this disclosure is not limited to. In some embodiments, the control circuit 110 may detect the capacitance between the mesh electrode 120 and any signal wire having a fixed voltage during the first operation mode. For example, the control circuit 110 may detect the capacitance between the second signal wiring 140b and the mesh electrode 120.

In operation S304, the control circuit 110 still operates in the first operation mode, and determines whether an object (e.g., a finger of the user) is on or near the sensing array 130 according to the sensing result. If the control circuit 110 determines that the object is on or near the sensing array 130, the fingerprint recognition device 100 then conduct operation S306. If the control circuit 110 determines that no object is on or near the sensing array 130, the fingerprint recognition device 100 may repeatedly conduct operation S302. Specifically, the control circuit 110 may compare the plurality of detected capacitance with each other, and when the change between the plurality of detected capacitance is over a threshold value, the control circuit 110 determines that the object is on or near the sensing array 130. The threshold value may be stored in a memory space of the control circuit 110 in advance.

In operation S306, the control circuit 110 switches from the first operation mode to a second operation mode (e.g., normal operation mode) and provides the driving voltage to the first signal wiring 140a in order to drive the sensing array 130 to perform fingerprint recognition to generate a plurality of sensing signals. The driving voltage is a high voltage, but this disclosure is not limited thereto. In some embodiments, the control circuit 110 may periodically provide a detection voltage to the mesh electrode 120 in the first operation mode and thus the power consumption is decreased because of the periodically detection manner, while the control circuit 110 may continuously provide a bias voltage to the mesh electrode 120 in the second operation mode so that the photosensitive element 220 detects touch operation of the user.

Then, in operation S308, the control circuit 110 reads the plurality of sensing signals generated by the sensing array 130, and calculates the sensed image according to the plurality of sensing signals.

In operation S310, the control circuit 110 determines, according to the sensing signals which the sensing array 130 respectively generates at different time points, whether the object has not on or near the sensing array 130 for a threshold time period. The threshold time period may be stored in the memory space of the control circuit 110 in advance. If the control circuit 110 determines that the object has not on or near the sensing array 130 for the threshold time period, the control circuit 110 then conduct operation S312. If the control circuit 110 determines that the object is on or near the sensing array 130 in the threshold time period, the control circuit 110 may repeatedly conduct operation S306.

In operation S312, the control circuit 110 switches from the second operation mode to the first operation mode, and then conducts operation S302.

As can be appreciated from the forgoing descriptions, the control circuit 110 can, during the sleep mode, provide less power to the sensing array 130 and needs not to perform complex image processing, while the control circuit 110 can response to the touch operation of the user in time to switch to the normal operation mode. Therefore, the combination of the fingerprint recognition device 100 and the driving method 300 has advantages of power saving and fast response.

Figure 4:
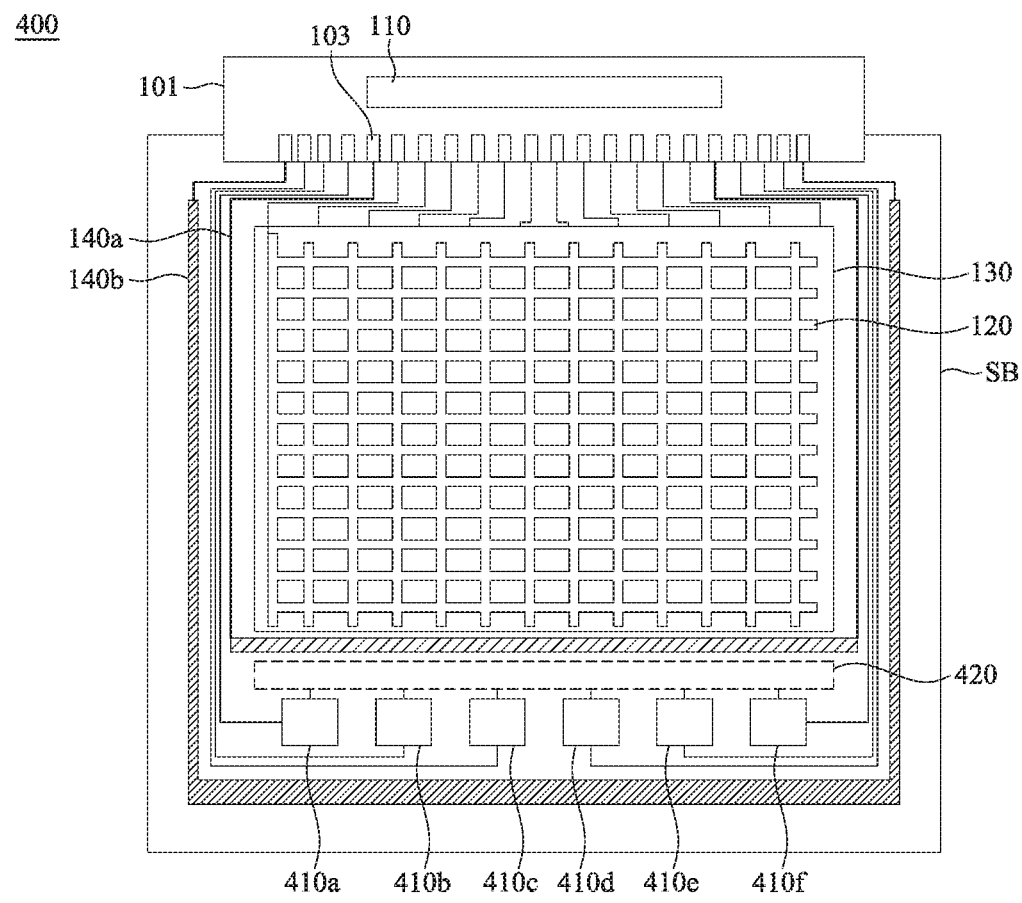
FIG. 4 is a simplified functional block diagram of a fingerprint recognition device according to one embodiment of the present disclosure.

FIG. 4 is a simplified functional block diagram of a fingerprint recognition device 400 according to one embodiment of the present disclosure. The fingerprint recognition device 400 is similar to the fingerprint recognition device 100, the difference is that the fingerprint recognition device 400 further comprises a plurality of test pads 410a-410f coupled with the control circuit 110. The test pads 410a-410f can be used to test whether the fingerprint recognition device 400 is defective, and the test pads 410a-410f are electrically disconnected from the sensing array 130 by the laser cutting process after the test is finished. That is, the laser cutting area 420 is configured to electrically isolates the test pads 410a-410f from the sensing array 130, but the test pads 410a-410f are coupled with the control circuit 110. The control circuit 110 is configured to detect the capacitance of the test pads 410a-410f to determine whether the object is on or near the sensing array 130, the specific detection method will be further described in the following paragraphs. The number of test pads in FIG. 4 is merely an exemplary embodiment, the practical number of the test pads can be determined based on practical design requirements (e.g., the resolution of the sensing array 130). The foregoing descriptions regarding the implementations, connections, operations, and related advantages of other corresponding functional blocks in the fingerprint recognition device 100 are also applicable to the fingerprint recognition device 400. For the sake of brevity, those descriptions will not be repeated here.

Figure 5:
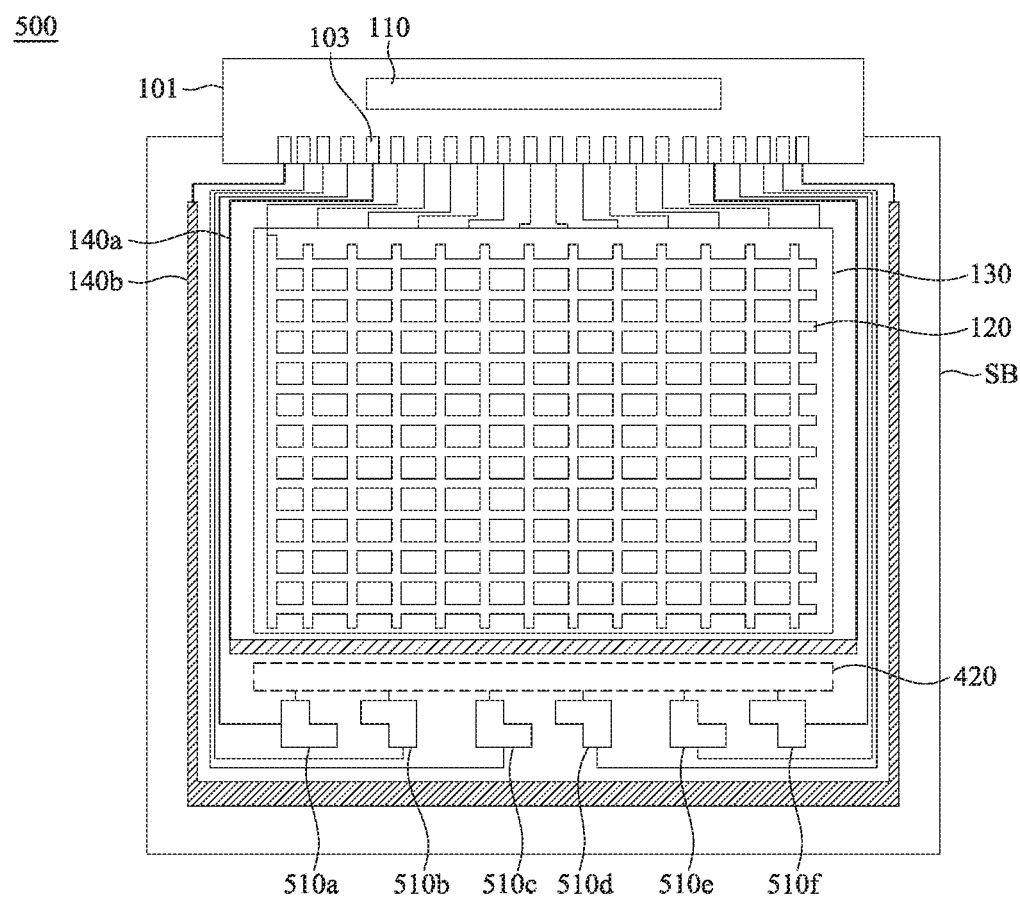
FIG. 5 is a simplified functional block diagram of a fingerprint recognition device according to one embodiment of the present disclosure.

The test pads 410a-410f are rectangular, but this disclosure is not limited thereto. FIG. 5 is a simplified functional block diagram of a fingerprint recognition device 500 according to one embodiment of the present disclosure. The fingerprint recognition device 500 is similar to the fingerprint recognition device 400, and the difference is that the fingerprint recognition device 500 comprises test pads 510a-510f having L-shaped. The laser cutting area 420 is configured to electrically isolated the test pads 510a-510f from the sensing array 130, but the test pads 510a-510f are coupled with the control circuit 110. In some embodiments, if two of the test pads 510a-510f which are adjacent and have corresponding shapes are moved toward each other, the two that adjacent and having corresponding shapes can be assembled as a rectangle. Since each pair of the test pads 510a-510f which are adjacent to each other have relative long edges in the corresponding sides, the capacitance between each pair of the test pads 510a-510f is increased. As a result, the detection sensitivity of the control circuit 110 for the capacitance of the test pads 510a-510f is increased.

In some embodiments, the control circuit 110 of the fingerprint recognition device 400 or the fingerprint recognition device 500 is realized by separated different circuits. For example, a part of the control circuit 110 for perform the wake-up function can be independently disposed on another flexible circuit board (not shown) near the test pads 410a-410f or the test pads 510a-510f and is coupled with the test pads 410a-410f or the test pads 510a-510f, so as to reduce the difficulty of wiring.

Figure 6:
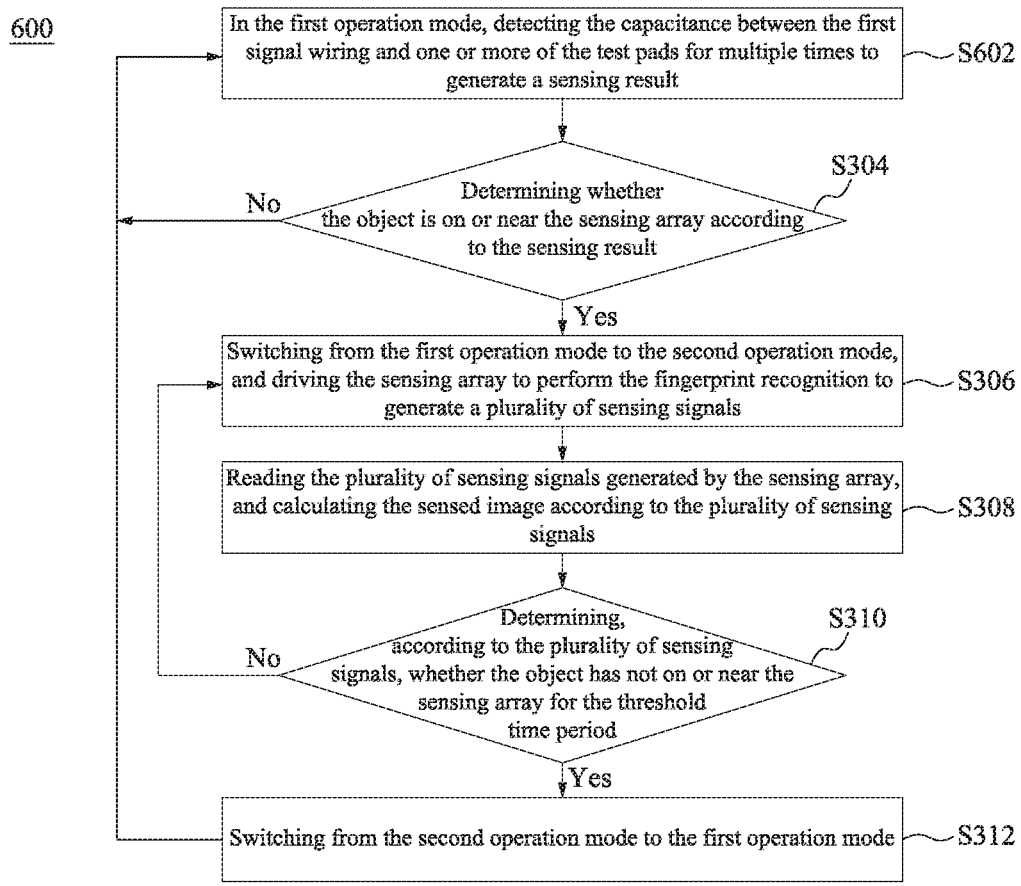
FIG. 6 is a flowchart of a driving method according to one embodiment of the present disclosure.

FIG. 6 is a flowchart of a driving method 600 according to one embodiment of the present disclosure. The driving method 600 is suitable for the fingerprint recognition device 400 and the fingerprint recognition device 500, and is similar to the driving method 300. The difference between the driving methods 600 and 300 is that the control circuit 110 operates in the first operation mode (e.g., the sleep mode) in operation S602 to periodically or non-periodically detect, for multiple times, the capacitance between the first signal wiring 140a and one or more of the test pads (e.g., the test pads 410a-410f or the test pads 510a-510f) in order to generate the sensing result, but this disclosure is not limited thereto. In practice, the control circuit 110 may detect the capacitance between one or more of the test pads and any signal wire having a fixed voltage during the first operation mode. For example, the control circuit 110 may detect the capacitance between the second signal wiring 140b and one or more of the test pads. The foregoing descriptions regarding to other corresponding operations and related advantages of the driving method 300 are also applicable to the driving method 600. For the sake of brevity, those descriptions will not be repeated here.

Figure 7:
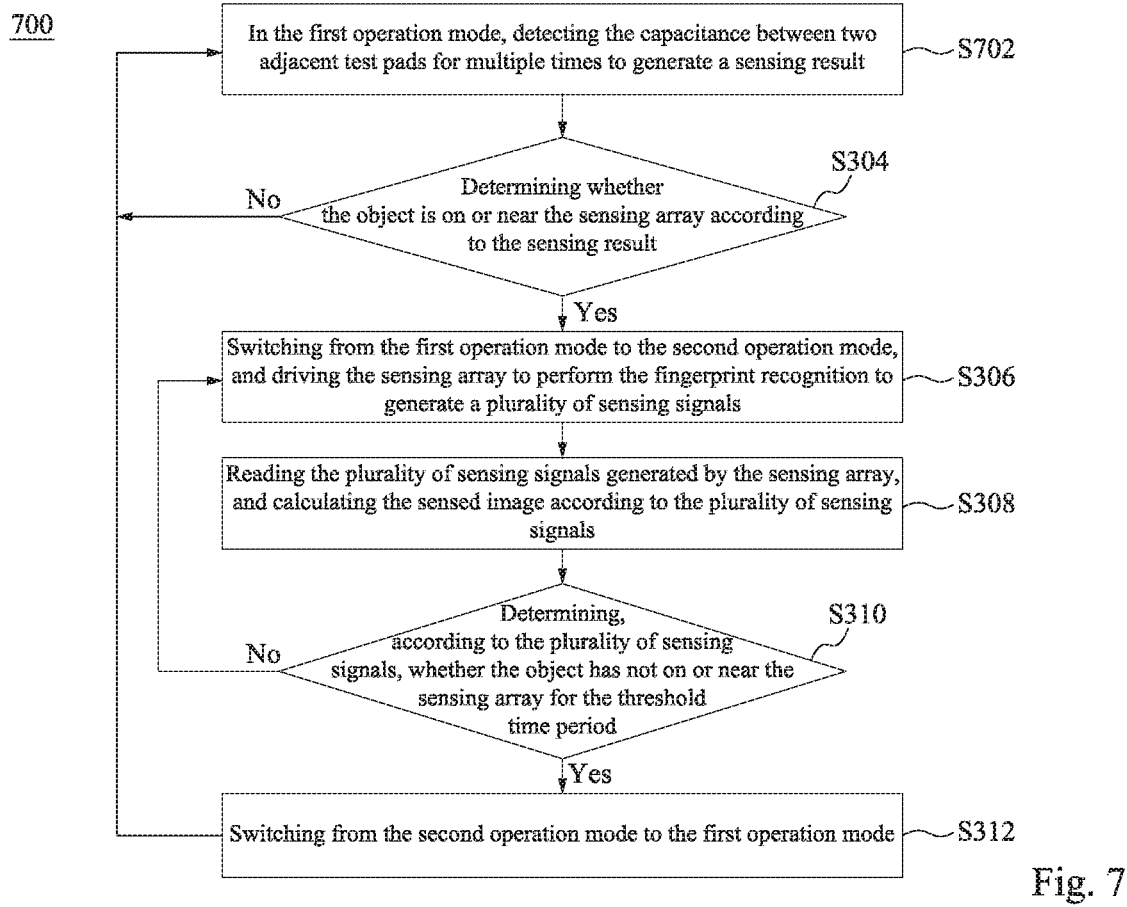
FIG. 7 is a flowchart of a driving method according to one embodiment of the present disclosure.

FIG. 7 is a flowchart of a driving method 700 according to one embodiment of the present disclosure. The driving method 700 is suitable for the fingerprint recognition device 400 and the fingerprint recognition device 500, and is similar to the driving method 300. The difference between the driving method 700 and 300 is that the control circuit 110 operates in the first operation mode (e.g., the sleep mode) in the operation S702 to periodically or non-periodically detect, for multiple times, the capacitance between any two adjacent ones of the test pads (e.g., the test pads 410a-410f or the test pads 510a-510f) in order to generate the sensing result. For example, the control circuit 110 may detect the capacitance between the test pad 410a and the test pad 410b, or the capacitance between the test pad 510d and the test pad 510e. The foregoing descriptions regarding to other corresponding operations and related advantages of the driving method 300 are also applicable to the driving method 600. For the sake of brevity, those descriptions will not be repeated here.

The execution order of the operations in the previous flowcharts is merely an example, rather than a restriction to practical implementations. For example, in the previous flowcharts, operations S308 and S310 may be performed simultaneously. In some embodiments, operations S310 and S312 may be omitted, and the decision of whether to switch the fingerprint recognition device 100 to the sleep mode may be decided by the user.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The size and relative sizes of some of the elements shown in drawings may be enlarged, or the shapes of some of the elements may be simplified so that the contents of the embodiments can be more clearly expressed.

Therefore, the shapes, sizes, relative sizes and relative positions of the various elements in the drawings are merely illustrative and should not be used to limit the scope of the claims of the present disclosure. In addition, the present disclosure may be embodied in many different forms, and the explanation of the present disclosure should not be limited to the embodiments provided by the present disclosure.

Throughout the description and claims, it will be understood that when a component is referred to as being "positioned on," "positioned above," "connected to," "engaged with," or "coupled with" another component, it can be directly on, directly connected to, or directly engaged with the other component, or intervening component may be present. In contrast, when a component is referred to as being "directly on," "directly connected to," or "directly engaged with" another component, there are no intervening components present.

In addition, the singular forms "a," "an," and "the" herein are intended to comprise the plural forms as well, unless the context clearly indicates otherwise. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fingerprint recognition device with a wake-up function, comprising:
    a signal wiring;
    a sensing array, at least partially surrounded by the signal wiring;
    a first electrode; and
    a control circuit, coupled with the signal wiring, the first electrode, and the sensing array, wherein the control circuit is configured to detect capacitance between the signal wiring and the first electrode in a first operation mode to generate a sensing result, and is configured to determine whether an object is on or near the sensing array according to the sensing result,
    wherein if the control circuit determines that the object is on or near the sensing array, the control circuit switches from the first operation mode to a second operation mode,
    wherein the control circuit is further configured to drive the sensing array by the signal wiring in order to generate a plurality of sensing signals in the second operation mode, and is further configured to calculate a sensed image according to the plurality of sensing signals.

2. The fingerprint recognition device of claim 1, wherein the first electrode is mesh-shaped and is at least partially overlapping with the sensing array in a vertical projection direction.

3. The fingerprint recognition device of claim 2, wherein the sensing array comprises a plurality of photosensitive elements, the first electrode is coupled with the plurality of photosensitive elements, and the first electrode is configured to provide a reference voltage to the plurality of photosensitive elements.

4. The fingerprint recognition device of claim 1, wherein the fingerprint recognition device comprises a peripheral area surrounding the sensing array, and the first electrode is a test pad disposed in the peripheral area.

5. The fingerprint recognition device of claim 4, further comprising a laser cutting area, wherein the laser cutting area electrically isolates the first electrode from the sensing array.

6. A fingerprint recognition device with a wake-up function, comprising:
    a signal wiring;
    a sensing array, at least partially surrounded by the signal wiring;
    a first test pad;
    a second test pad; and
    a control circuit, coupled with the signal wiring, the first test pad, the second test pad, and the sensing array, wherein the control circuit is configured to detect capacitance between the first test pad and the second test pad in a first operation mode to generate a sensing result, and is configured to determine whether an object is on or near the sensing array according to the sensing result,
    wherein if the control circuit determines that the object is on or near the sensing array, the control circuit switches from the first operation mode to a second operation mode,
    wherein the control circuit is further configured to provide a driving voltage to the signal wiring in the second operation mode to drive the sensing array to generate a plurality of sensing signals, and the control circuit is further configured to calculate a sensed image according to the plurality of sensing signals.

7. The fingerprint recognition device of claim 6, further comprising a laser cutting area, wherein the laser cutting area electrically isolates the first test pad and the second test pad from the sensing array.

8. A driving method, suitable for a fingerprint recognition device, comprising:
    in a first operation mode, detecting capacitance between a signal wiring of the fingerprint recognition device and a first electrode of the fingerprint recognition device to generate a sensing result;
    determining, according to the sensing result, whether an object is on or near a sensing array of the fingerprint recognition device, wherein the sensing array is at least partially surrounded by the signal wiring, and if the object is on or near the sensing array, switches from the first operation mode to a second operation mode;

in the second operation mode, driving the sensing array to generate a plurality of sensing signals; and generating a sensed image according to the plurality of sensing signals.

9. The driving method of claim 8, further comprising:

in the second operation mode, determining whether the object has not been on or near the sensing array for a threshold time period according to the plurality of sensing signals; and if the object has not been on or near the sensing array for the threshold time period, switching from the second operation mode to the first operation mode.

10. A driving method, suitable for a fingerprint recognition device, comprising:

in a first operation mode, detecting capacitance between a first test pad of the fingerprint recognition device and a second test pad of the fingerprint recognition device to generate a sensing result, wherein a laser cutting area of the fingerprint recognition device electrically isolates the first test pad and the second test pad from a sensing array of the fingerprint recognition device;

determining, according to the sensing result, whether an object is on or near the sensing array, wherein if the object is on or near the sensing array, switches from the first operation mode to a second operation mode;

in the second operation mode, driving the sensing array by a signal wiring to generate a plurality of sensing signals, wherein the sensing array is at least partially surrounded by the signal wiring; and generating a sensed image according to the plurality of sensing signals.

* * * * *